United States Patent [19]
Kadota

[11] 3,930,408
[45] Jan. 6, 1976

[54] MAXIMUM MILEAGE INDICATOR FOR VEHICLE

[75] Inventor: Masahiro Kadota, Susono, Japan

[73] Assignee: Toyota Jidosha Kogyo Kabushiki Kaisha, Japan

[22] Filed: Apr. 1, 1975

[21] Appl. No.: 563,969

[30] Foreign Application Priority Data
- May 30, 1974 Japan .............................. 49-60260
- Oct. 12, 1974 Japan .............................. 49-117447
- May 30, 1974 Japan .............................. 49-61341

[52] U.S. Cl. .................................................. 73/114
[51] Int. Cl.² ............................................ G01F 9/00
[58] Field of Search ...................... 73/114, 115, 116; 235/61 J

[56] References Cited
UNITED STATES PATENTS

| | | |
|---|---|---|
| 2,593,628 | 4/1952 | Strong ........................... 73/114 UX |
| 3,014,366 | 12/1961 | Faunce ............................... 73/114 |
| 3,347,092 | 10/1967 | Statson ............................. 73/114 |

Primary Examiner—Jerry W. Myracle

[57] ABSTRACT

A maximum mileage indicator comprises a pressure gauging mechanism including the Bourdon gauge having a pointer for indicating the vacuum in an intake manifold and a speed metering mechanism including an indicator disc or cam board rotated by an angle determined by the vehicle speed, the pointer of the pressure gauging mechanism and the indicator disc or cam board being so arranged as to provide information on whether or not the vehicle is being drived under the maximum mileage condition for the desired vehicle speed.

10 Claims, 10 Drawing Figures

- ■ BV1: AT LEVEL ROAD WITH NORMAL LOAD
- ▨ BV2: AT EASY FALLING GRADE
- ▨ BV3: AT EASY RISING GRADE
- ▨ BV4: AT MEDIUM RISING GRADE
- ▭ BV5: AT MEDIUM FALLING GRADE

MAXIMUM MILEAGE INDICATOR FOR VEHICLE

BACKGROUND OF THE INVENTION

This invention relates to a maximum mileage indicator for providing information about the maximum mileage driving condition for the desired vehicle speed.

When a vehicle is intended to be driven under the maximum mileage condition, the reading of a vacuum gauge mounted on an instrument panel has been utilized since it has been believed that as the vacuum gauge indicates higher vacuum, the mileage becomes higher value. The term "mileage" herein used is defined as the ratio of the distance traveled to the fuel consumed (killometer per liter). However, the above relationship between mileage and vacuum holds only for the same gear ratio, since the same vehicle speed may have different gear ratios from the first gear (low gear) to the fourth gear (top gear). At the same vehicle speed, the first gear offers the highest vacuum reading and the fourth gear offers the lowest vacuum reading, so that it is most preferable for the maximum mileage driving to take the lowest gear ratio and to drive a vehicle at a speed as low as possible. This does not meet the primary requirement for a vehicle design that it is to be driven at the desired vehicle speed with the proper gear ratio selected as occasion demands. Therefore, the reading to the vacuum gauge has been able to be used only for a mere reference.

SUMMARY OF THE INVENTION

Accordingly, it is an object of the present invention to provide a maximum mileage indicator for providing information about the maximum mileage driving condition for the desired vehicle speed.

It is another object of the invention to provide a maximum mileage indicator which is compact enough to be mounted on the conventional instrument panel space and simple in construction as well as low in manufacturing cost.

The principle of the present invention will be described with reference to FIG. 1. A set of characteristic curves (a) shows the relationship between mileage versus vehicle speed or road speed. It can be seen from the characteristic curves (a) that at the speed range greater than 30 km/h the maximum mileage is obtained by the use of the fourth gear ratio, at the speed range between 30 km/h and 25 km/h by the use of the third gear ratio, at the speed range between 25 km/h and 15 km/h by the use of the second gear ratio and at the speed range less than 15 km/h by the use of the first gear, in which case there is no other alternative because of the lack of tractive effort. Consequently, the maximum mileage versus vehicle speed is represented by the curve BD for all the vehicle speed ranges.

A set of curves (b) illustrates the vacuum in an intake manifold versus vehicle speed for each gear ratio. The curve BV represents the vacuum corresponding to the maximum mileage curve BD. This BV curve may be used as follows: Assuming that a vehicle is intended to be driven at a speed of 40 km/h under the maximum mileage condition, the BV curve shows that it is necessary to take such a gear ratio as that the vacuum gauge should read 360 mmHg of pressure. When the third gear is used, the vacuum gauge reads a pressure of 400 mmHg so that it is necessary to shift up the lever to the fourth gear to produce a pressure of 360 mmHg. When the second gear is used, the vacuum gauge reads a pressure of 440 mmHg so that the similar lever operation should be taken to provide the reading of 360 mmHg on the vacuum gauge. Such sequential reading of the gauge will require the special attention of a driver, making the load too heavy for the driver.

According to the present invention, a maximum mileage indicator comprises a speedometer including an indicator disc or cam board which is rotatable in proportion with the vehicle speed and has the maximum mileage curve BV printed thereon, and a vacuum gauge having a pointer so arranged as to be on the curve BV. With this arrangement, since an indicator window cut on the dial plate reveals a portion of the BV curve corresponding to the vehicle speed, the position of the pointer relative to the portion of the BV curve indicates whether or not the vehicle is running under the maximum mileage condition for the selected vehicle speed. In other words, a vehicle can be driven under the maximum mileage condition by controlling it in such a manner that the pointer of the vacuum gauge lies on the portion of the BV curve.

The indicator board having the maximum mileage curve BV is preferably formed as a disc board rotatable in proportion to the vehicle speed. Alternatively, it may be formed as a cam board having its circumference shaped to conform to the shape of the curve BV. In this case there is provided a maximum mileage indicator rod placed in contact with the cam surface so that the indicator rod may move in parallel relation with the pointer of the vacuum gauge, thus providing the maximum mileage information. In addition, this maximum mileage indicator may be constructed integrally with a speedometer to provide a compactness and low manufacturing cost.

BRIEF DESCRIPTION OF THE DRAWINGS

Further objectives and advantages of the invention will appear from the following detailed description of the embodiments thereof and from the accompanying drawings, wherein.

DESCRIPTION OF THE PREFERRED EMBODIMENTS

Figure 2:
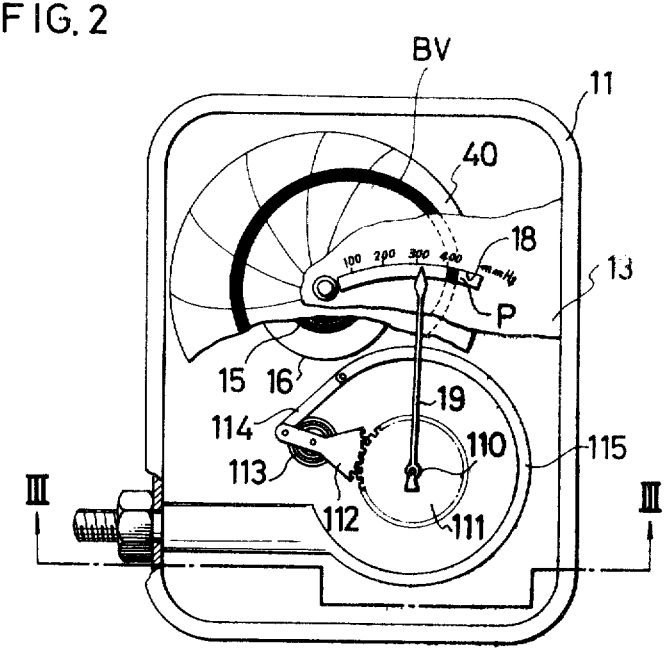
FIG. 2 is a plan view of one form of maximum mileage indicator embodying the invention.

Referring to the attached drawings, in FIG. 2, there is shown a maximum mileage indicator comprises a casing 11, a dial plate 13 mounted on the casing 11, a transparent cover 12 placed over the dial plate 13, and a Bourdon gauge including a Bourdon tube 115 fixed at one end to the side wall of the casing 11 and at the other end to a connecting rod 114 which is coupled at the other end to the lever portion of a segment gear 112 which engages with a gear 111 to which a pointer 19 is attached by a pin 110.

Figure 3:
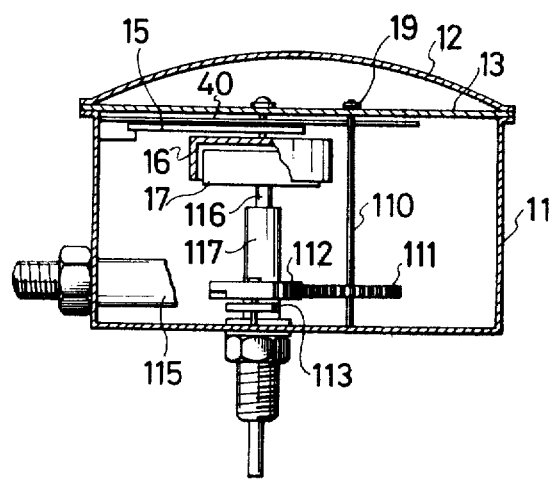
FIG. 3 is a sectional view taken along the line III—III of FIG. 2 with parts partially broken away.

Referring to FIG. 3, the pin 110 extends upwards through the dial plate 13 to the pointer 19 and downwards to a bearing (not shown) fixed to the bottom of the casing 11 and is secured at its leg portion of the gear 111. The gear 111 engages with the segment gear 112 which has the lever portion coupled to one end of connecting rod 114. As described above, the other end of the connecting rod 114 is coupled to the tip of the Bourdon tube 115 which is tightly sealed. The other end of Bourdon tube 115 or inlet port is airtightly connected to an intake manifold of an engine (not shown). The dial plate 13 is formed with a slit window 18 the upper edge of which is graduated in pressure scale.

Under the dial plate 13 is disposed an indicator board 40 secured to the shaft of a speedometer including a hair spring 15, a rotor 16, a magnet 17 and a magnet driving shaft 116 to which the rotation of wheels of a vehicle is transmitted through a flexible wire which is well known in the art. The magnet driving shaft 116 is supported by a bearing 117 in such a manner as shown in FIG. 3.

Figure 1:
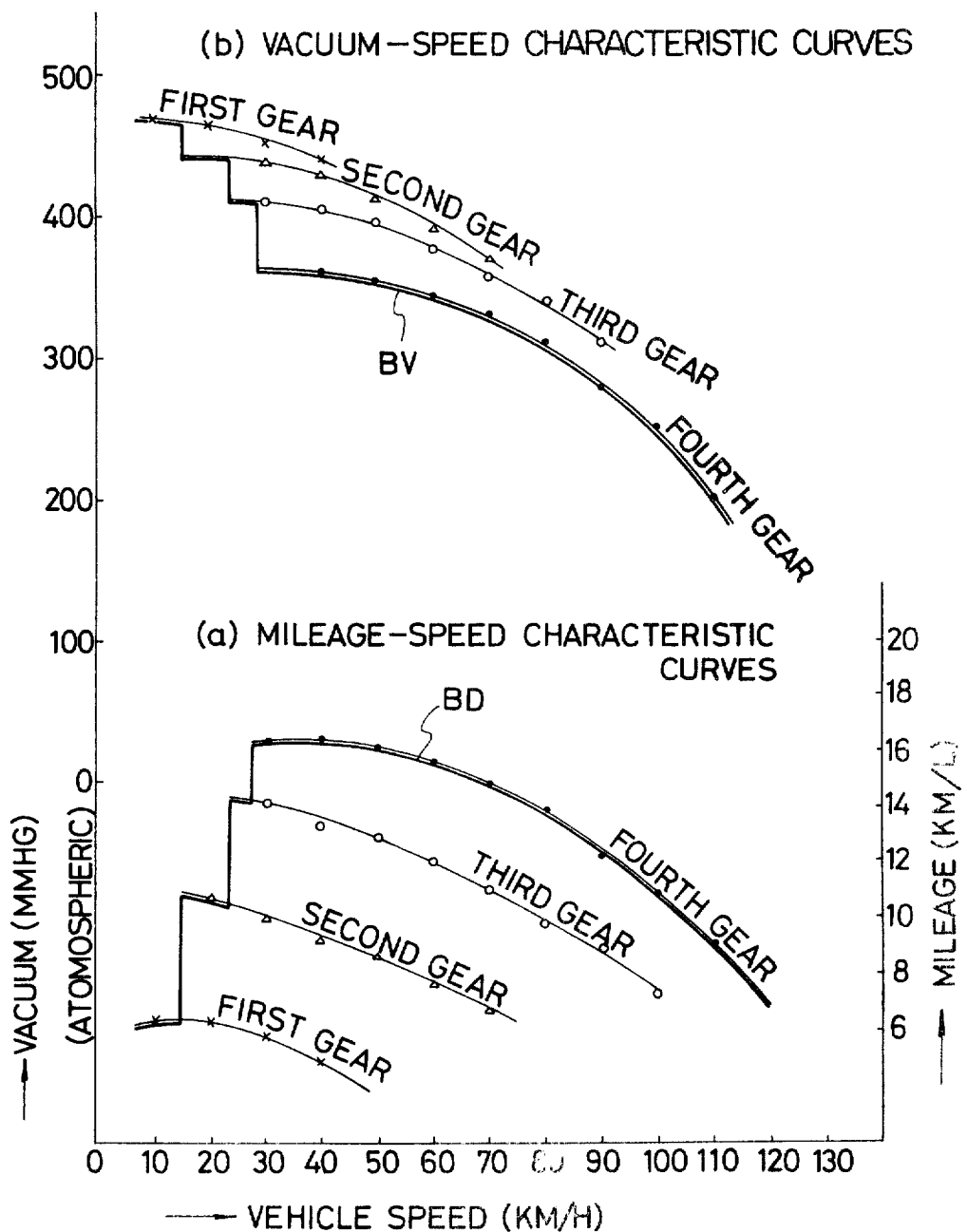
FIG. 1 is a graph representing the maximum mileage curves.
Figure 4:
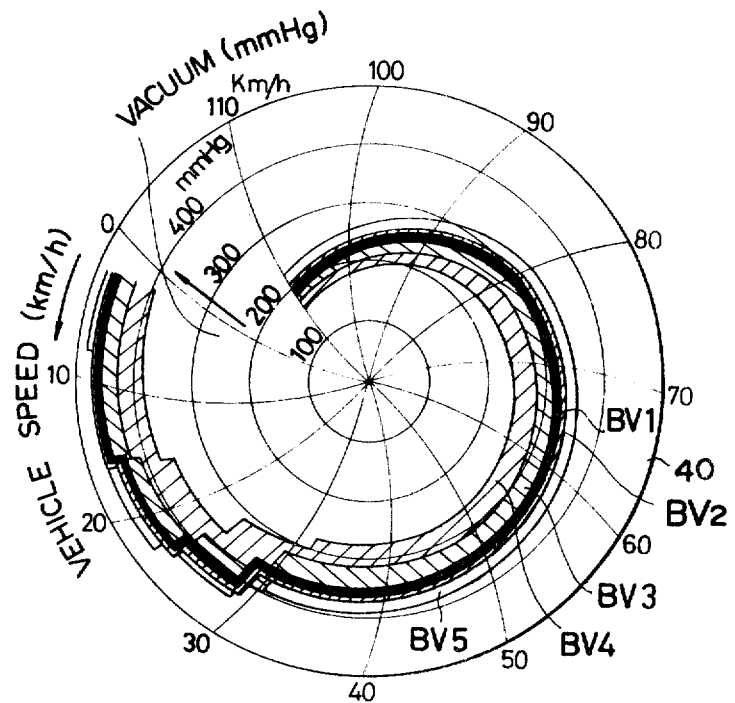
FIG. 4 is a plan view of one form of an indicator board 40 used for the indicator shown in FIGS. 2 and 3.

FIG. 4 illustrates one example of the indicator board 40 on which the maximum mileage curves BV's are drawn for various conditions. The speed scale of a vehicle is printed on the circumference of the indicator board 40 while the vacuum scale in the intake manifold is printed on concentric circles from the center to the circumference as shown in FIG. 4. A radial line representing vehicle speed is such a curve as to conform to the locus of the pointer 19 (FIGS. 2 and 3). The curve BV1 is constructed by connecting the plots of vacuum for each vehicle speed in the similar way to the BV curve in FIG. 1. The width of the curve represents the amount of scatter in measurement due to variations in the vehicle weight or engine conditions. The shape of BV curve depends upon the vehicle weight and the state of road gradient and road surface. The BV curves from BV1 to BV5 are printed for different operating conditions from at a level road with a normal load to at a medium falling grade as illustrated in FIG. 4. In practice it is preferred that the BV curves from BV1 to BV5 are distinctly colored, for example, from green for the maximum mileage to red for the minimum mileage.

The manner of operation of the indicator described in connection with FIGS. 2 and 3 will be explained particularly with reference to FIG. 2. In proportion to the vehicle speed, the indicator board 40 rotates clockwise or counter-clockwise so that a vehicle speed line observed through the slit window 18 will represent the vehicle speed while a portion P of the BV curve will indicate the ideal pressure (400 mmHg) required for the maximum mileage at the vehicle speed. On the other hand, the pointer 19 indicates an actual pressure (320 mmHg) so that it is required to operate a shift lever or accelerator pedal in such a manner that the pointer 19 overlaps the portion P of the BV curve in the slit window 18. Thus, the overlap of the pointer 19 on the portion P indicates that the vehicle is running under the maximum mileage driving condition.

Figure 5:
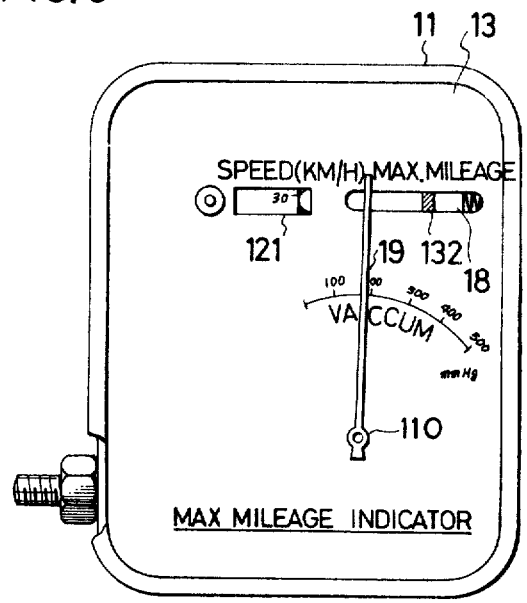
FIG. 5 is a plan view of another form of maximum mileage indicator according to the invention.
Figure 6:
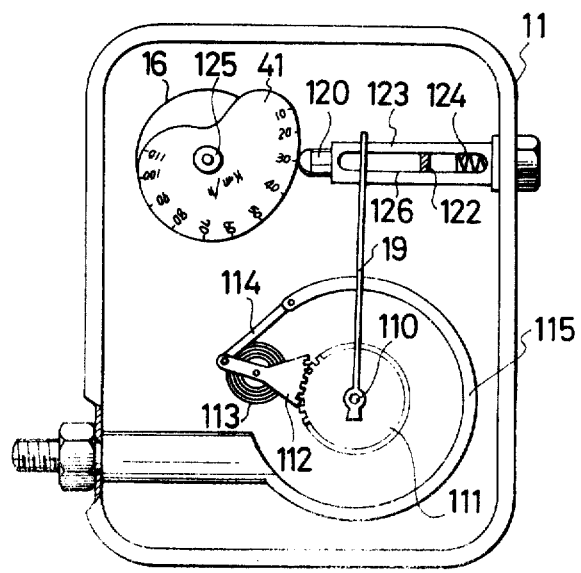
FIG. 6 is a plan view of the indicator shown in FIG. 5 with a dial plate taken apart for clearness.

Referring to FIGS. 5 and 6 there is shown another embodiment of the maximum mileage indicator according to the invention. It comprises a casing 11 provided with a dial plate 13 formed with slit windows 18 and 121, a pointer 19 secured to a pin 110 and placed between the dial plate 13 and a transparent cover 112 mounted on the casing 11, and a vacuum gauge including a Bourdon tube 115, a connecting rod 114, a segment gear 112, a windup spring 113, a gear 111 and the pointer 19. The outer end of the Bourdon tube 115 is designed to couple with the intake manifold of an engine. As the vacuum inside the Bourdon tube 115 increases, the free end of the tube 115 turns counter-clockwise, as shown in FIG. 6, rotating the segment gear 112 against the windup spring 113 and the gear 111 clockwise, together with the pointer 19.

In this embodiment there is provided a cam board 41 which is secured to a shaft 125 fixed to the rotor 16 of a speedometer so that it turns around in proportion to the vehicle speed. The rotor 16 which is well known in the art is opposed at a distance to a magnet (not shown) to which the rotation of wheels of a vehicle is transmitted through a flexible wire.

The cam 41 is formed in such a way that its shape conforms to the spiral line BV's is constructed in the similar way to the BV curves on the indicator board 40 as shown in FIG. 4. The contour of the cam board 41 contacts with an indicator rod 120 which is slidably supported by a cylindrical guide member 123 fixed to the casing 11 and having a square hole 126 cut in line with the slit window 18 of the dial plate 13. A coil spring 124 is provided within the guide member 123 to push the indicator rod 120 to the left as shown in FIG. 6. When the cam board 41 turns around corresponding to the vehicle speed, the indicator rod 120 in contact with the cam face travels to and fro in the lateral direction. The indicator rod 120 is provided with a mark 122, whose position indicates the ideal vacuum required for the maximum mileage driving for a given vehicle speed. Since the pointer 19 of the vacuum gauge indicates an actual vacuum in the intake manifold, control may be made in such a manner that the pointer 19 overlaps the mark 122 to thus provide the maximum mileage driving condition. In addition, when the cam board 41 is graduated in the speed scale, the vehicle speed can be read through the slit window 121 of the dial plate 13.

Figure 7:
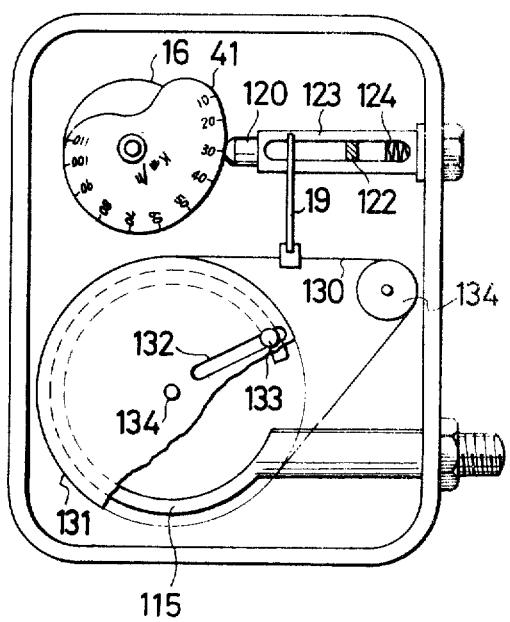
FIG. 7 is a plan view of an alternate embodiment of the indicator means 19 shown in FIGS. 5 and 6.
Figure 8:
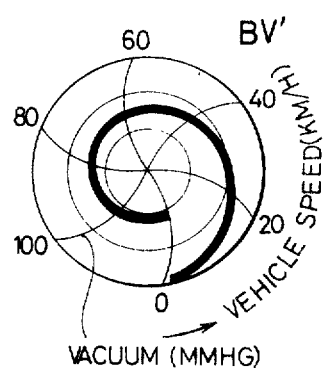
FIG. 8 is a circular graph showing a spiral curve used for the formation of a cam board.

FIG. 7 illustrates the essential parts of the modified embodiment as shown in FIGS. 5 and 6. This embodiment is different from the one shown in FIGS. 5 and 6 only in the indicating mechanism of the vacuum gauge. A pulley 131 is supported by a shaft 134 provided at the center of the Bourdon tube 115 and has a slit 132 cut in the radial direction. The Bourdon tube 115 has at its free end a pin 133 which slidably engages with the slit 132 of the pulley 131 so that the pulley 131 rotates clockwise or counterclockwise as the Bourdon tube 115 contracts or expands depending on the vacuum therein. A string, rope or belt 130 is held in strain over the pulley 131 and an idle roller 134. The pointer 19 is fixed to the string 130 so that it travels transversely in accordance with the rotation of the pulley 131.

Figure 9:
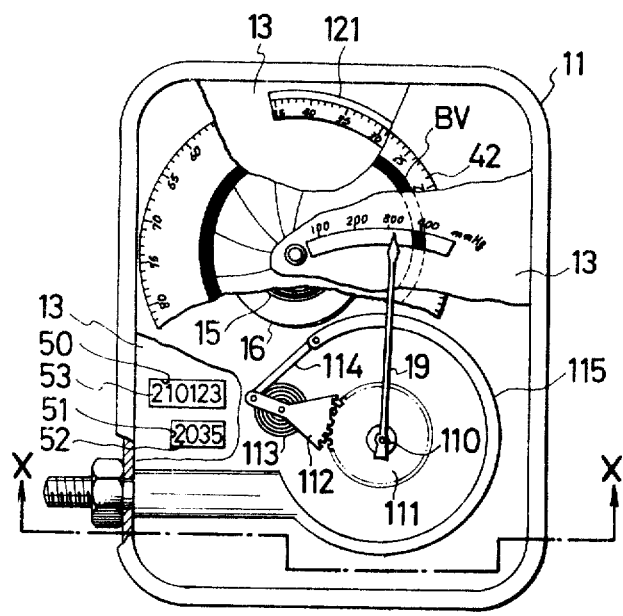
FIG. 9 is a plan view of the modified embodiment of the invention.
Figure 10:
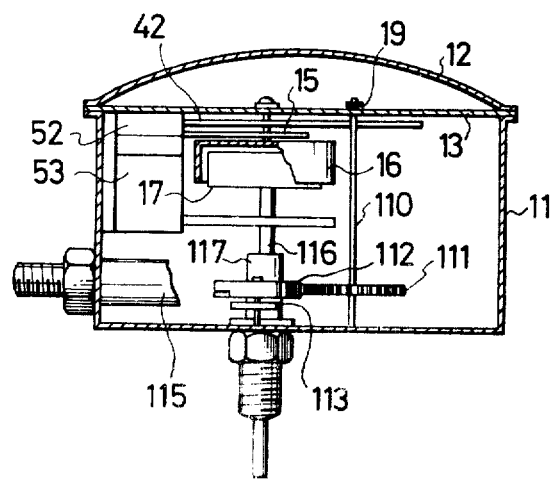
FIG. 10 is a sectional view of the indicator shown in FIG. 9 taken along the line X—X with parts partially broken away.

Referring now to FIGS. 9 and 10 there is shown the modified preferred embodiment of maximum mileage indicator of the invention as shown in FIGS. 2 and 3. On the indicator board 42 the speed scale is printed as well as the maximum mileage curve BV. Correspondingly, the dial plate 13 is formed with a slit window 121 through which the vehicle speed can be read. The dial plate 13 of this embodiment further has window 50 and 51 for an odometer 53 and trip-type odometer 52, respectively. These odometer 53 and trip-type odometer 52 are driven by a gear 160 fixed to a shaft 116 through a train of gear (not shown). The rest of the parts of this embodiment are identical with those as shown FIGS. 2 and 3. It is noted however that the speedometer window 121 is disposed at a place making an angle 90° with the slit window 18 so that the speed scale should be printed on the indicator board 42 rotated counterclockwise by an angle 90° with the corresponding portion P of the BV curve observed in the slit window 18. When the indicator board 42 is graduated in vehicle speed as shown in FIG. 4, the speedometer window 121 should be placed on the extended line of the slit window 18.

With this arrangement, the maximum mileage indicator can be also used for a speedometer so that the space on the instrument panel and the manufacturing cost can be greatly reduced. Moreover, it makes easier to read both the vehicle speed and maximum mileage scales at the same time.

While the invention has been particularly illustrated and described with reference to the preferred embodiments thereof, it will be understood by those skilled in the art that the foregoing and other changes in form and details may be made therein without departing from the spirit and scope of the invention.

What is claimed is:

1. A maximum mileage indicator comprising a pressure sensing mechanism responsive to the vacuum in an intake manifold to drive an indicator means;
    a rotatable means having at least one maximum mileage curve printed thereon with the vacuum scale taken in the radial direction and the vehicle speed scale in the circumferential direction;
    a speed sensing mechanism responsive to the vehicle speed to rotate said rotatable means by an angle proportional to the vehicle speed; and
    said indicator means so arranged as to move substantially along the radial line of said rotatable means.

2. A maximum mileage indicator as defined in claim 1 wherein said rotatable means is a disc board having at least one maximum mileage curve printed on its surface.

3. A maximum mileage indicator as defined in claim 2 wherein said maximum mileage curves are distinctly colored from each other.

4. A maximum mileage indicator as defined in claim 1 wherein said rotatable means is a disc board having the vehicle speed scale as well as the maximum mileage curve printed on its surface.

5. A maximum mileage indicator as defined in claim 1 wherein said rotatable means is a cam board having a contour similar to the figure of said maximum mileage curve.

6. A maximum mileage indicator as defined in claim 5 wherein said cam board has the vehicle speed scale on its surface.

7. A maximum mileage indicator as defined in claim 6 wherein said indicator further comprises a maximum mileage indicator rod having its one end made contact with the contour surface of said cam board so that it will travel along the locus of said indicator means.

8. A maximum mileage indicator as defined in claim 5 wherein said indicator further comprises a maximum mileage indicator rod having its one end made contact with the contour surface of said cam board so that it will travel along the locus of said indicator means.

9. A maximum mileage indicator as defined in claim 1 wherein said indicator means is so constructed as to rotate on its axis.

10. A maximum mileage indicator as defined in claim 1 wherein said indicator means is so constructed as to travel along a straight line.

* * * * *